April 28, 1936.    L. A. FRANK ET AL    2,038,833
BEER TAP
Filed July 10, 1935
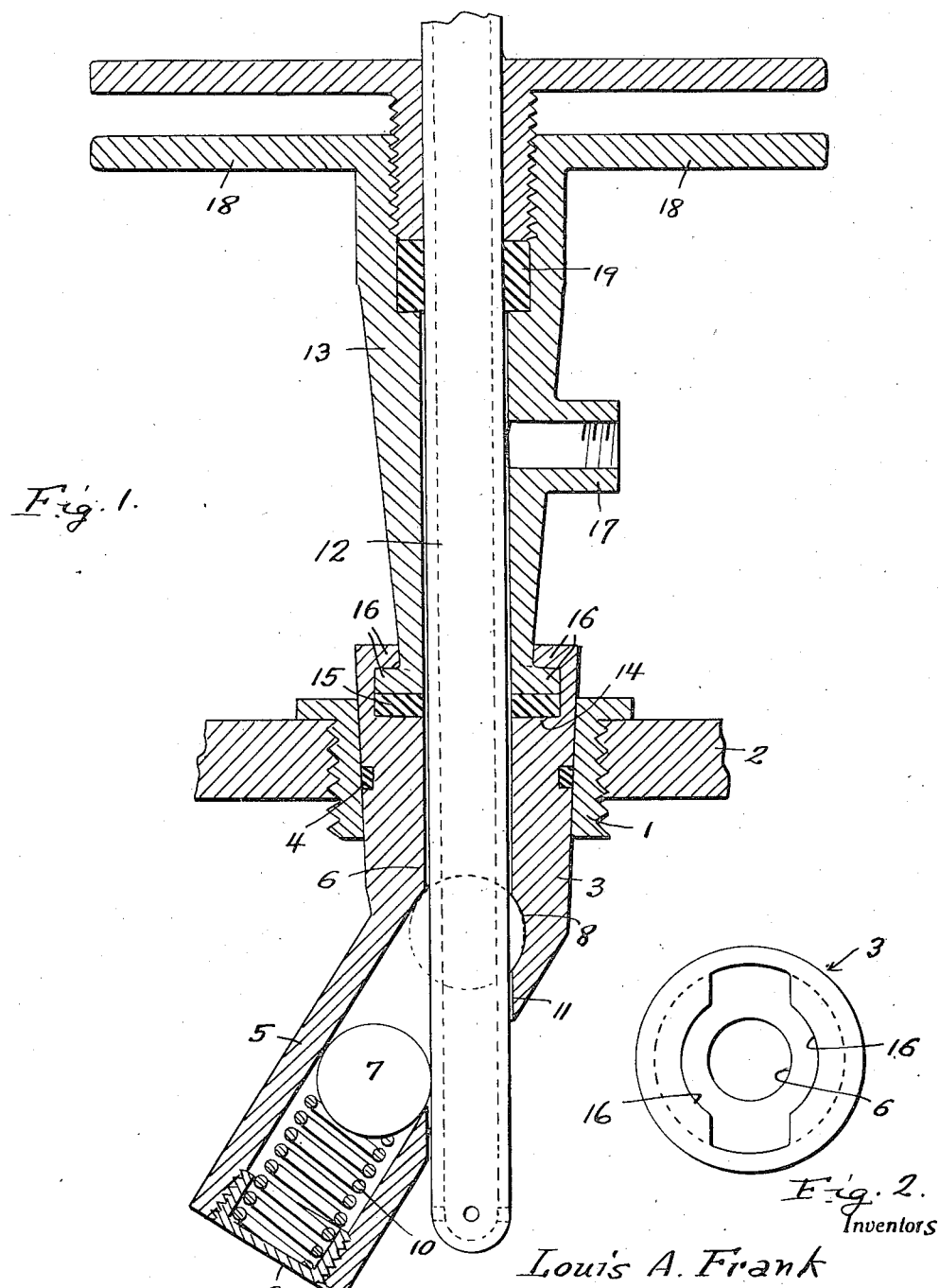

Patented Apr. 28, 1936

2,038,833

UNITED STATES PATENT OFFICE 2,038,833

BEER TAP

Louis A. Frank and William Francis Murphy, Albany, N. Y.

Application July 10, 1935, Serial No. 30,707

2 Claims. (Cl. 225—3)

The present invention relates to new and useful improvements in beer taps and has for one of its important objects to provide, in a manner as hereinafter set forth, a device of this character embodying a novel construction, combination and arrangement of parts through the medium of which loss of the beverage or pressure prior to, during and after insertion of the rod will be prevented.

Other objects of the invention are to provide a beer tap of the aforementioned character which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1 is a vertical sectional view through a beer tap constructed in accordance with the present invention.

Figure 2 is a detail view in top plan of the bung.

Referring now to the drawing in detail, it will be seen that the embodiment of the invention which has been illustrated comprises a tapered bushing 1 which is adapted to be threadedly mounted in the head 2 of the barrel or container. The bushing 1 is for the reception of a tapered, tightly fitting bung 3 which, it will be noted, has formed therein a circumferential groove for the reception of a packing 4 for preventing leakage between said bung and said bushing.

Formed integrally with the lower end of the bung 3 is a diagonally extending tube 5 which communicates with the bore 6 of said bung, said tube constituting a cage for a ball check valve 7. At its upper end, the tube 5 is formed to provide a seat 8 with which the ball valve 7 is engageable for closing the bore 6. A closure 9 is threaded into the lower end portion of the tube 5. A coil spring 10 yieldingly urges the ball valve 7 toward the seat 8. The tube 5 has formed therein an opening 11 which is in alignment with the bore 6.

The bore 6 and the opening 11 are for the passage of a rod 12 upon which a tapping fixture or sleeve 13 is mounted. The upper end portion of the bung 3 has formed therein a socket 14 for the reception of the lower end portion of the sleeve 13. A gasket 15 is provided in the socket 14 for preventing leakage between the numbers 3 and 13. Coacting cams 16 are provided on the upper end of the bung 3 and on the lower end of the sleeve 13 for securing said sleeve to said bung and for compressing the gasket 15.

The sleeve 13 includes a nipple 17 for connection with a source of air or other gases under pressure. Handles 18 are provided on the upper end of the sleeve 13 to facilitate connecting said sleeve to the bung 3. A packing 19 is provided in the upper portion of the sleeve 13 for preventing leakage around the rod 12 above the nipple 17.

In use, the ball 7 is normally engaged on the seat 8, thus closing the bore 6. When the barrel is to be tapped, the rod 12 is inserted through the bung 3, said rod forcing the ball valve 7 aside against the tension of the spring 10 to the position shown in full lines in Figure 1 of the drawing, said rod passing through the opening 11 into the barrel. The sleeve 13 is then engaged in the socket 14 and tightened, the gland 19 is then tightened and the beverage may now be dispensed.

It is believed that the many advantages of a beer tap constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed. For example, the bung 3 may be externally threaded and mounted in new barrels, the bushing 1 being dispensed with. As the barrel is closed when it is returned empty to the brewery, sanitation is promoted. While the device is intended particularly for use in connection with beer barrels, said device may, of course, be used on any types of barrels or containers for which it may be found adapted and desirable. It will be noted that a space is provided around the rod 12 for the downward passage of air or other gases under pressure from the inlet nipple 17 into the barrel or other container for forcing the beverage therefrom.

What is claimed is:—

1. A tap for a beer barrel of the type provided with a tapering bushing, said tap comprising a tapering bung for disposition in the bushing and provided with an obliquely disposed sleeve at its lower end gradually merging therewith, said sleeve being closed at its lower end, a spring pressed valve element in the obliquely disposed sleeve, a seat for the valve in the upper portion of the sleeve, said bung being provided with a bore therethrough opening into the sleeve at the seat, said sleeve being provided with an opening in the wall thereof alined with the bore in the bung.

2. A tap for a beer barrel of the type provided with a tapering bushing, said tap comprising a tapering bung for disposition in the bushing and provided with an obliquely disposed sleeve at its lower end, said sleeve being closed at its lower end, a spring pressed valve element in the obliquely disposed sleeve, a seat for the valve in the upper portion of the sleeve, said bung being provided with a bore therethrough opening into the sleeve at the seat, said sleeve being provided with an opening in the wall thereof alined with the bore in the bung, a second sleeve for detachable connection to the upper end of the bung, packing means between the second sleeve and the bung, packing means at the upper end of the last mentioned sleeve, and a compressed fluid inlet in the side of the sleeve.

LOUIS A. FRANK.
WILLIAM FRANCIS MURPHY.